(12) United States Patent
Iwamoto

(10) Patent No.: US 8,310,738 B2
(45) Date of Patent: Nov. 13, 2012

(54) SCANNING OPTICAL DEVICE, IMAGE FORMING DEVICE AND JITTER CORRECTION METHOD

(75) Inventor: Kazuyuki Iwamoto, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1224 days.

(21) Appl. No.: 12/117,327

(22) Filed: May 8, 2008

(65) Prior Publication Data

US 2008/0285095 A1 Nov. 20, 2008

(30) Foreign Application Priority Data

May 17, 2007 (JP) ................................. 2007-132030

(51) Int. Cl.
*H04N 1/04* (2006.01)
(52) U.S. Cl. ......... 358/481; 358/1.7; 358/480; 358/471; 347/241; 356/398
(58) Field of Classification Search ................... 358/1.7, 358/471, 480, 481; 347/241; 356/398
See application file for complete search history.

(56) References Cited

U.S. PATENT DOCUMENTS 5,371,608 A * 12/1994 Muto et al. .................... 358/412

FOREIGN PATENT DOCUMENTS

| JP | 1088418 A2 | 4/1989 |
| JP | 2615668 | 3/1997 |

* cited by examiner

*Primary Examiner* — Jacky X Zheng
(74) *Attorney, Agent, or Firm* — Fitzpatrick, Cella, Harper & Scinto

(57) ABSTRACT

A scanning optical device includes a rotating polygonal mirror having a plurality of reflecting faces. A first light source emits a first light beam from one section obtained by sectioning the scanning optical device with a plane passing through the rotation axis of the rotating polygonal mirror. A second light source emits a second light beam from the other section. The first calculation unit calculates scan time of the first light source. The second calculation unit calculates scan time of the second light source. The jitter correction unit corrects jitter by controlling a pixel clock supplied to the first light source according to the scan time of the second light source. The jitter correction unit also corrects jitter by controlling a pixel clock supplied to the second light source according to the scan time of the first light source.

8 Claims, 14 Drawing Sheets

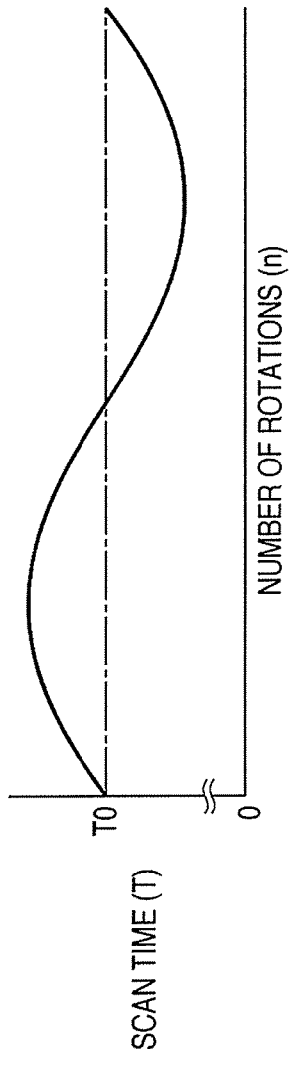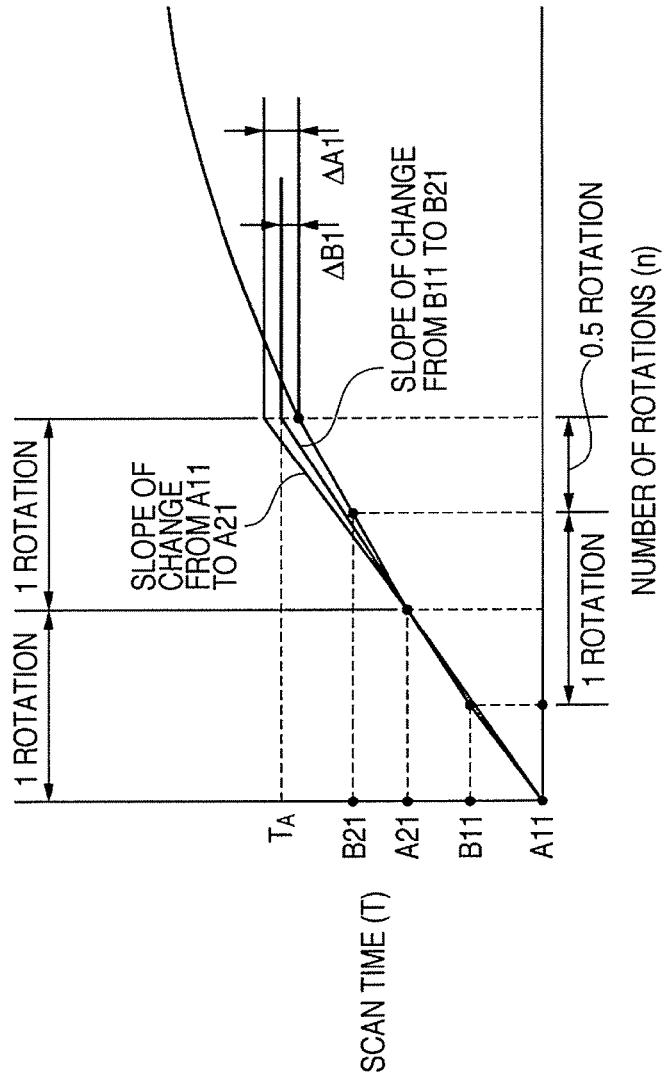
FIG. 8A
FIG. 8B

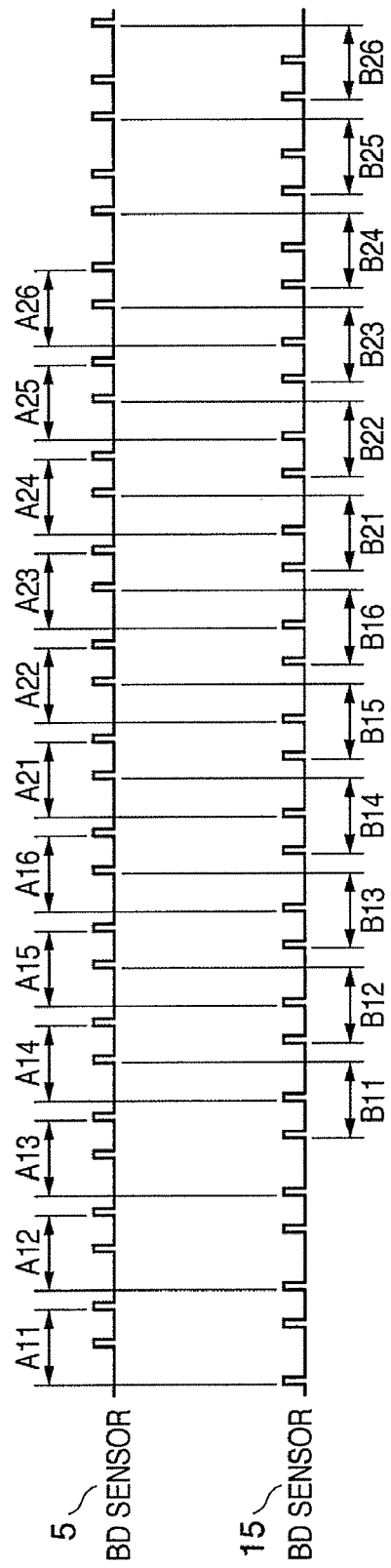

SCANNING OPTICAL DEVICE, IMAGE FORMING DEVICE AND JITTER CORRECTION METHOD

BACKGROUND OF THE INVENTION

1. Field of the Invention

The present invention relates to a scanning optical device applicable to an image forming device or the like, and a jitter correction method therefor.

2. Description of the Related Art

Image forming devices are known in which a photosensitive member is exposed to laser light to form an electrostatic latent image, and the electrostatic latent image is developed with toner and transferred onto recording paper to obtain an image. Such an image forming device is provided with a scanning optical device for exposing the photosensitive member to laser light. Generally, the scanning optical device deflects/scans laser light using a rotating polygonal mirror.

However, jitter occurs due to discrepancies among the reflection coefficients of the reflecting faces of the rotating polygonal mirror, or due to changes of the rotation period of the motor that drives the rotating polygonal mirror. As used herein, "jitter" refers to shifts of the exposure position in the main scanning direction on the photosensitive member.

Japanese Patent No. 2615668 proposes a method for reducing jitter by correcting the discrepancy among the reflection coefficients of the reflecting faces of a rotating polygonal mirror and the changes of the rotation period of the motor that drives the rotating polygonal mirror.

Japanese Patent No. 2615668 is directed to a monochrome image forming device. Recently, however, demand is growing for color image forming devices as well. Particularly, tandem type color image forming devices that employ a plurality of photosensitive members have the problem that jitter causes color shifting in the main scanning direction when toner images are superimposed.

SUMMARY OF THE INVENTION

In view of the foregoing, an aim is to solve at least one of the problems described above and other problems. It is an feature of the present invention to provide, for example, an inexpensive and compact scanning optical device that can reduce color shifting in the main scanning direction. Other problems will be understood through the entire specification.

The present invention can be implemented as, for example, a scanning optical device, image forming device or jitter correction method. A scanning optical device includes: a rotating polygonal mirror provided with a plurality of reflecting faces which reflect an incident light beam while the rotating polygonal mirror is rotated; a first light source which emits a first light beam from one section obtained by sectioning the scanning optical device with a plane passing through the rotational axis of the rotating polygonal mirror; and a second light source which emits a second light beam from the other section. The scanning optical device further includes an imaging unit, first to fourth detection units, first and second calculation units, a storage unit, a jitter correction unit, and the like. The imaging unit images first and second light beams having been deflected/scanned by the rotating polygonal mirror onto the corresponding photosensitive members. The first detection unit detects the first light beam on the scanning start side in the main scanning direction. The second detection unit detects the first light beam on the scanning end side in the main scanning direction. The third detection unit detects the second light beam on the scanning start side in the main scanning direction. The fourth detection unit detects the second light beam on the scanning end side in the main scanning direction. The first calculation unit calculates a time interval between the time when the first light beam is detected by the first detection unit and the time when the first light beam is detected by the second detection unit, as the scan time of the first light source. The second calculation unit calculates a time interval between the time when the second light beam is detected by the third detection unit and the time when the second light beam is detected by the fourth detection unit, as the scan time of the second light source. The storage unit stores the scan time of the respective reflecting faces of the rotating polygonal mirror calculated by the first calculation unit and the second calculation unit. The jitter correction unit corrects jitter by controlling a pixel clock supplied to the first light source according to the scan time of the second light source. The jitter correction unit also corrects jitter by controlling a pixel clock supplied to the second light source according to the scan time of the first light source.

Further features of the present invention will become apparent from the following description of exemplary embodiments with reference to the attached drawings.

BRIEF DESCRIPTION OF THE DRAWINGS

FIGS. 8A and 8B are diagrams that show a change of scan time according to an embodiment of the present invention.

FIG. 14 is a time chart of BD sensors according to Embodiment 3 of the present invention.

DESCRIPTION OF THE EMBODIMENTS

Hereinafter, embodiments of the present invention will be described. The individual embodiments described below are useful in understanding various concepts of the present invention such as a superordinate concept, an intermediate concept, and a subordinate concept. It should be understood that the technical scope of the present invention is defined by the appended claims, and is not limited by the individual embodiments described below.

Embodiment 1

Hereinafter, an embodiment in which a scanning optical device according to the present invention is applied to a tandem type multicolor image forming device (particularly, a color printer) will be described with reference to the attached drawings. The scanning optical device may also be referred to below as an "optical scanning device", "scanner", or "exposure device". The image forming device may be implemented as, for example, a printing apparatus, printer, copying machine, multifunction peripheral, or facsimile machine.

Figure 1:
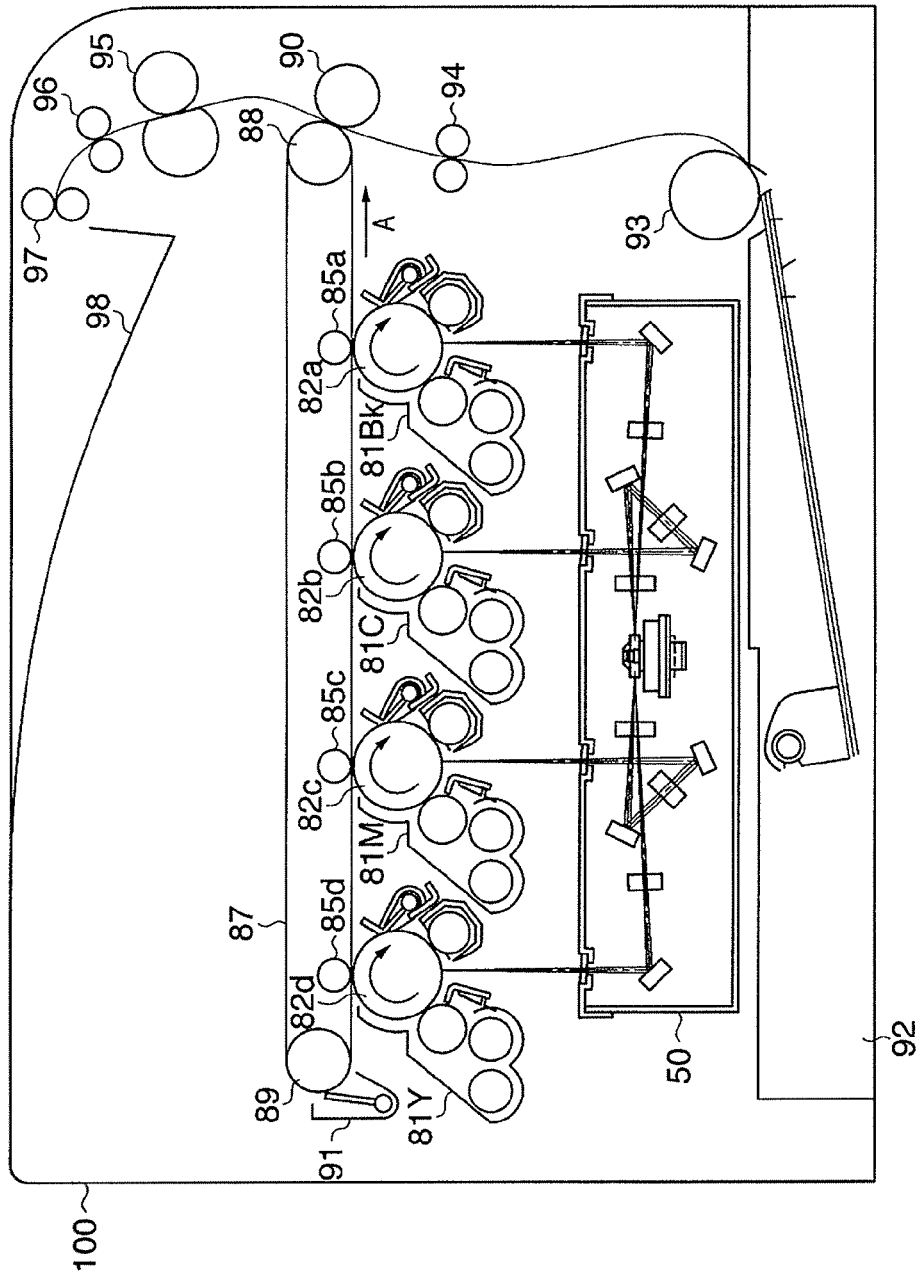
FIG. 1 is a schematic cross-sectional view of a tandem type color printer according to an embodiment of the present invention.

FIG. 1 is a schematic cross-sectional view of a tandem type color printer according to an embodiment of the present invention. The color printer 100 includes a plurality of image forming units (also referred to as "image forming stations"). An image forming unit 81Bk forms a black image. An image forming unit 81C forms a cyan image. An image forming unit 81M forms a magenta image. An image forming unit 81Y forms a yellow image. These four image forming units 81Bk, 81C, 81M and 81Y are arranged in a line with a predetermined spacing therebetween.

The image forming units 81Bk, 81C, 81M and 81Y have drum-shaped photosensitive members (hereinafter referred to as "photosensitive drums") 82a, 82b, 82c and 82d, respectively. The photosensitive drums 82a, 82b, 82c, 82d are negatively charged OPC photosensitive members made of an aluminum drum base covered with a photoconductive layer, and are rotationally driven at a predetermined process speed in the direction of the arrows (clockwise in FIG. 1) by a driving device (not shown). Transfer rollers 85a, 85b, 85c and 85d serving as transfer devices are disposed to face the photosensitive drums 82a, 82b, 82c and 82d, respectively. The transfer rollers 85a, 85b, 85c and 85d are in contact with the photosensitive drum 82a, 82b, 82c and 82d, respectively, with an intermediate transfer belt 87 arranged therebetween at the respective primary transfer nip portions.

The intermediate transfer belt 87 is tensioned between a pair of belt conveying rollers 88 and 89, and is rotated (moved) in the direction of arrow A (counterclockwise in FIG. 1). The intermediate transfer belt 87 is configured of a dielectric resin such as polycarbonate, a polyethylene terephthalate resin film or a polyvinylidene fluoride resin film.

The belt conveying roller 88 is in contact with a secondary transfer roller 90 with the intermediate transfer belt 87 interposed therebetween, forming a secondary transfer unit. The belt conveying roller 88 and the secondary transfer roller 90 are examples of the transfer device. A belt cleaning device 91 that removes and collects residual toner left on the surface of the intermediate transfer belt 87 after transfer is disposed outside the intermediate transfer belt 87 near the belt conveying roller 89.

A paper feed cassette 92 stores transfer paper which is a sheet-shaped recording medium. The transfer paper is also referred to below as "recording material", "recording medium", "sheet", "transfer material" or "transfer paper", or is simply referred to as "paper". The transfer paper stored in the paper feed cassette 92 is supplied sheet by sheet by a paper feed roller 93. When the transfer paper is conveyed to a pair of registration rollers 94, the conveyance stops once. At the timing when a toner image reaches the secondary transfer unit, the conveyance of the transfer paper is resumed. The transfer paper on which the toner image is transferred by the secondary transfer unit is conveyed to a fixing device 95 where the toner image is fixed with heat. The transfer paper is then conveyed by a pair of conveying rollers 96 and a pair of discharge rollers 97, and discharged onto a discharge tray 98.

Figure 2:
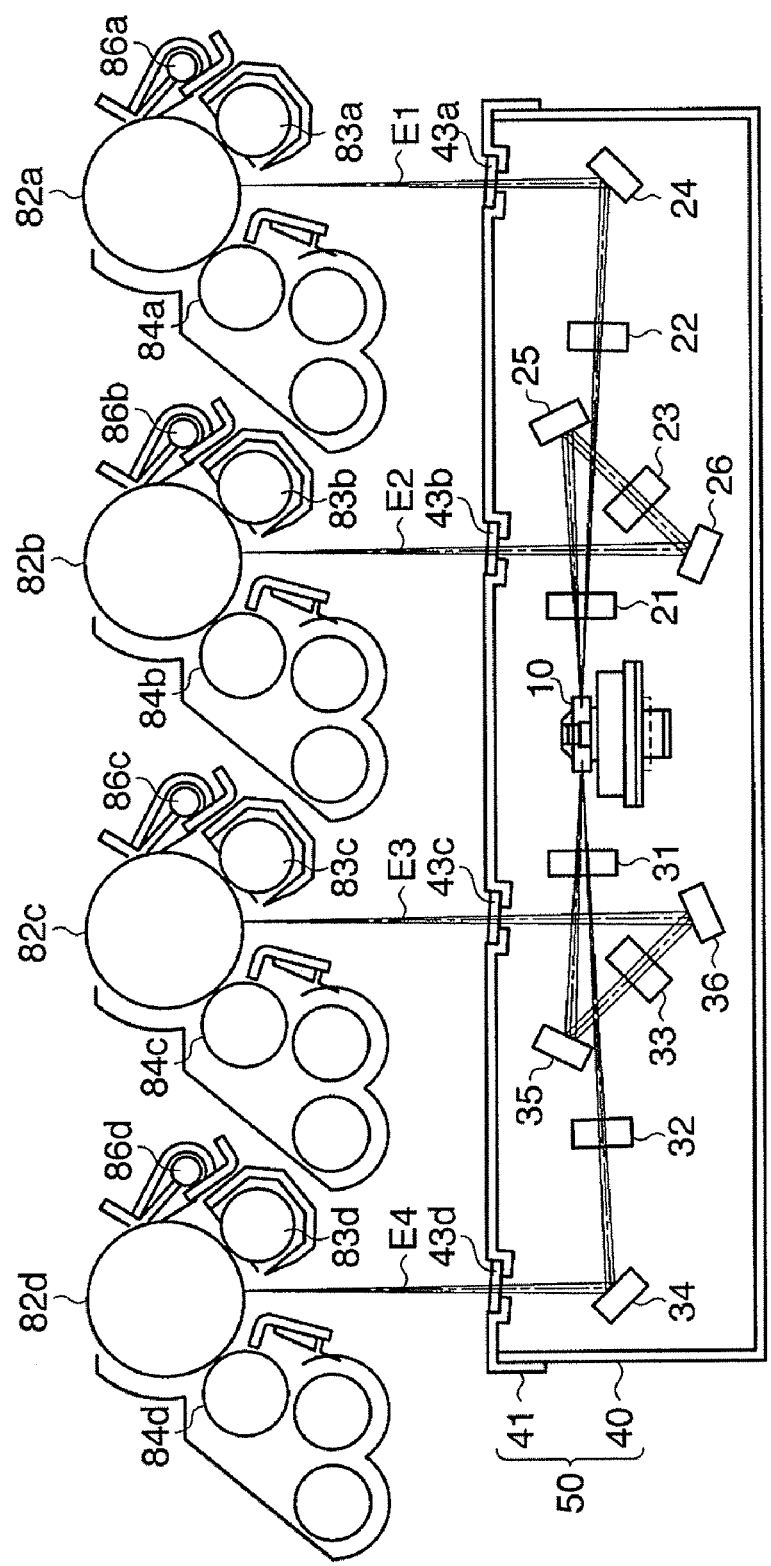
FIG. 2 is a schematic cross-sectional view illustrating a scanning optical device and an image forming unit.

FIG. 2 is a schematic cross-sectional view illustrating a scanning optical device and an image forming unit. Primary charging devices 83a, 83b, 83c and 83d, development devices 84a, 84b, 84c and 84d, and drum cleaning devices 86a, 86b, 86c and 86d are disposed around the photosensitive drums 82a, 82b, 82c and 82d, respectively. A scanning optical device 50 is disposed below the primary charging devices 83a, 83b, 83c and 83d and the development devices 84a, 84b, 84c and 84d.

The development devices 84a, 84b, 84c and 84d contain black toner, cyan toner, magenta toner and yellow toner, respectively. The primary charging devices 83a, 83b, 83c and 83d serving as primary charging units charge the surface of the photosensitive drums 82a, 82b, 82c and 82d, respectively, to a predetermined negative potential using a charging bias applied by a charging bias power source (not shown). The development devices 84a, 84b, 84c and 84d contain toner, and adhere their toner of respective colors onto the electrostatic latent image formed on the photosensitive drums 82a, 82b, 82c and 82d so as to develop a toner image (to form a visual image). The drum cleaning devices 86a, 86b, 86c and 86d are made of, for example, cleaning blades for removing residual toner left on the photosensitive drum after the primary transfer from the photosensitive member. The toner image is also referred to as "developed image" below.

The scanning optical device 50 is provided with a polygon mirror 10. The polygon mirror 10 is an example of a rotating polygonal mirror having a plurality of reflecting faces that reflect an incident light beam while the polygon mirror is rotated. The following describes the scanning optical device 50 in detail with reference to FIGS. 2 to 5.

Figure 3:
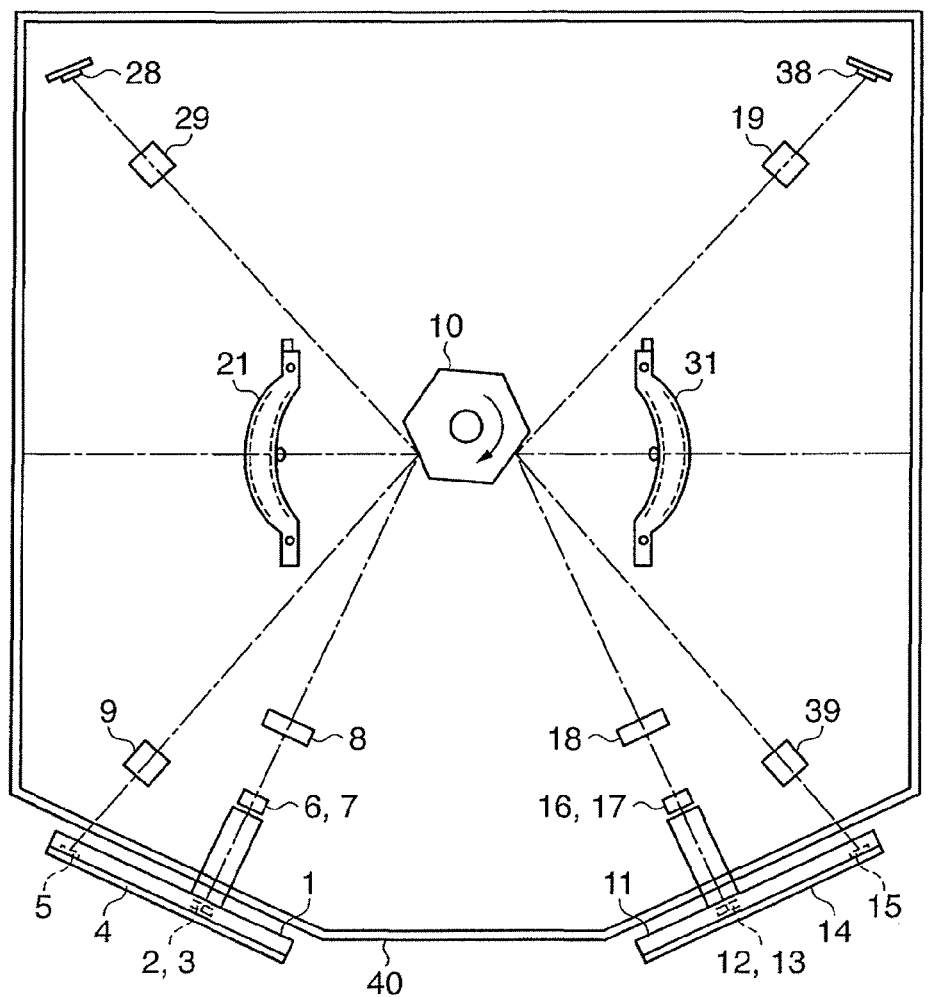
FIG. 3 is a schematic plan view of a scanning optical device according to an embodiment of the present invention.
Figure 4:
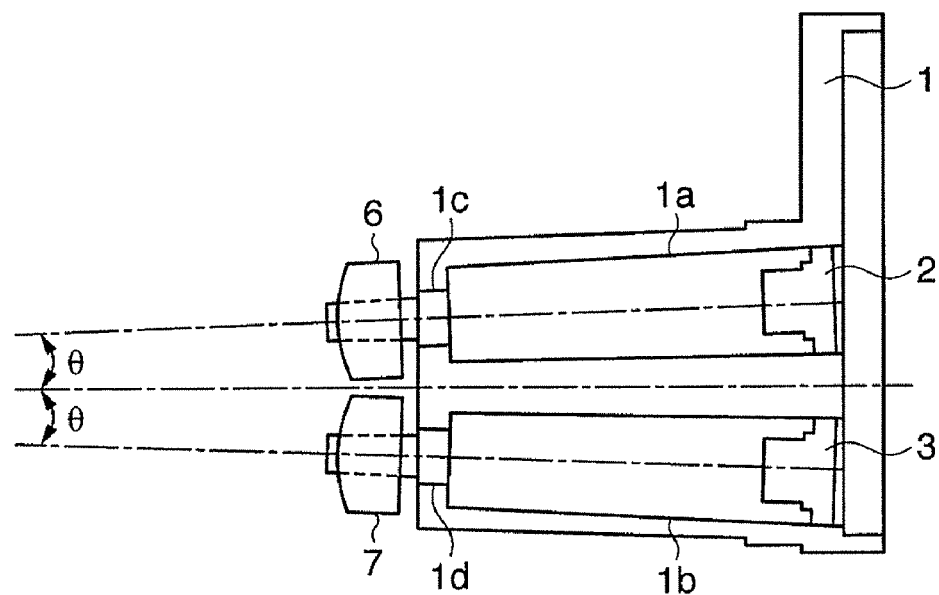
FIG. 4 is a cross-sectional view of a laser holder unit.
Figure 5:
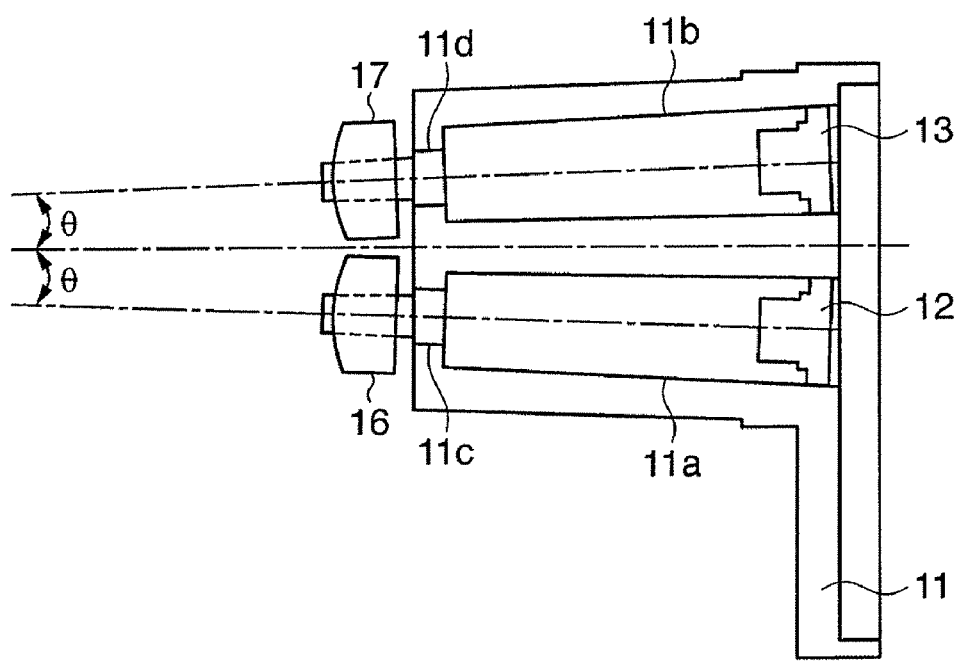
FIG. 5 is a cross-sectional view of a laser holder unit.

FIG. 3 is a schematic plan view of a scanning optical device according to an embodiment of the present invention. FIG. 3 shows a view of the scanning optical device 50 as viewed from the image forming units of FIGS. 1 and 2. FIGS. 4 and 5 are cross-sectional views of laser holder units.

Referring to FIGS. 3 and 4, a laser holder 1 holds semiconductor lasers (single beam lasers) 2 and 3, which are an example of light sources, that are press-fitted to barrels 1a and 1b, respectively. An electrical circuit board 4 is provided with a laser driving circuit that drives the semiconductor lasers 2 and 3. A BD sensor 5 is disposed on the electrical circuit board 4. The BD sensor 5 detects a light beam reflected by the polygon mirror 10, and outputs a detection signal of the main scanning direction. This detection signal indicates the scanning start from an end portion of an image. In Embodiment 1, the BD sensor 5 is an example of a first detection unit, which detects the first light beam on the scanning start side in the main scanning direction. As used herein, "main scanning direction" generally refers to a direction that is parallel to a scanning plane of the light beam. Also, "sub-scanning direction" generally refers to a direction orthogonal to the main scanning direction. The main scanning direction and the sub-scanning direction are relative directions defined by the scanning plane of the light beam, rather than absolute directions in three-dimensional space.

As shown in FIG. 4, the tubular holding members 1a and 1b hold the semiconductor lasers 2 and 3, such that the optical axes of the semiconductor lasers 2 and 3 intersect each other at a predetermined angle θ in the sub-scanning direction. Accordingly, the semiconductor lasers 2 and 3 can be held with a very small spacing therebetween. Diaphragm units 1c and 1d are disposed at the anterior ends of the tubular holding members 1a and 1b, in correspondence with the semiconductor lasers 2 and 3, respectively. The diaphragm units 1c and 1d shape the light beams emitted from the semiconductor lasers 2 and 3 into the desired and optimal beam shapes. Further, collimating lenses 6 and 7 that convert the light beams having passed through the diaphragm units 1c and 1d into substantially parallel beams are disposed at the further anterior ends of the tubular holding members 1a and 1b.

As shown in FIG. 5, a laser holder 11 is a component identical to the laser holder 1, and holds semiconductor lasers 12 and 13 press-fitted to tubular holding members 11a and 11b, respectively. An electrical circuit board 14 is provided with a laser driving circuit that drives the semiconductor lasers 12 and 13. A BD sensor 15 is disposed on the electrical circuit board 14. Referring to FIG. 3, the BD sensor 15 detects a light beam reflected by the polygon mirror, and outputs a detection signal of the main scanning direction. This detection signal indicates the scanning end at the other end portion of the image. In Embodiment 1, the BD sensor 15 is an example of a fourth detection unit, which detects the second light beam on the scanning end side in the main scanning direction.

The tubular holding members 11a and 11b hold the semiconductor lasers 12 and 13 such that the optical axes of the semiconductor lasers 12 and 13 intersect each other at a predetermined angle θ in the sub-scanning direction. Accordingly, the semiconductor lasers 12 and 13 can be held with a very small spacing therebetween. Diaphragm units 11c and 11d are disposed at the anterior ends of the tubular holding members 11a and 11b, in correspondence with the semiconductor lasers 12 and 13. The diaphragm units 11c and 11d shape the light beams emitted from the semiconductor lasers 12 and 13 into the desired and optimal beam shapes. Further, collimating lenses 16 and 17 that convert the light beams having passed through the diaphragm units 11c and 11d into substantially parallel beams are disposed at the further anterior ends of the tubular holding members 11a and 11b.

An optical casing 40 shown in FIGS. 2 and 3 is a casing for containing the optical components of the scanning optical device 50. A fitting hole and a long hole are provided in a side wall of the optical casing 40 to position the laser holder 1. Fitting portions formed on the exterior of the tubular holding members 1a and 1b of the laser holder 1 are fitted into the fitting hole and the long hole. The laser holder 1 is attached to the optical casing 40 as described above, so that the positional relationship between the semiconductor laser 2, 3 and the optical components contained in the optical casing 40 can be secured with high accuracy.

The laser holder 11 is positioned in the optical casing 40 in the same manner as the laser holder 1. It is therefore possible to secure the positional relationship between the semiconductor laser 12, 13 and the optical components contained in the optical casing 40 with high accuracy.

A cylindrical lens 8 shown in FIG. 3 has a predetermined refractive power only in the sub-scanning direction. A BD lens 9 images the light beams having been reflected by the polygon mirror 10 on the light receiving surface of the BD sensor 5. Note that in the present embodiment, the BD sensor 5 is provided in the position corresponding to the semiconductor laser 2, and no BD sensor is provided in the position corresponding to the semiconductor laser 3. Because the semiconductor lasers 2 and 3 are provided in the sub-scanning direction in the single laser holder 1, the semiconductor laser 3 can start scanning at the same timing as the semiconductor laser 2. For this reason, the BD sensor corresponding to the semiconductor laser 3 can be omitted.

A cylindrical lens 18 has a predetermined refractive power only in the sub-scanning direction. A BD lens 19 images the light beams having been reflected by the polygon mirror 10 on the light receiving surface of the BD sensor 15. Note that in the present embodiment, the BD sensor 15 is provided in the position corresponding to the semiconductor laser 12, and no BD sensor is provided in the position corresponding to the semiconductor laser 13. The reason for this is the same as that described for the semiconductor lasers 2 and 3.

The polygon mirror 10 is rotated at a predetermined speed in the direction of the arrow (clockwise) in FIG. 3 by a motor (not shown) to deflect/scan light beams emitted from the semiconductor lasers. It can be seen from FIG. 3 that the semiconductor laser 2 is an example of a first light source which emits a first light beam from one section obtained by sectioning the scanning optical device with a plane passing through the rotational axis of the polygon mirror 10. It can also be seen that the semiconductor laser 12 is an example of a second light source which emits a second light beam from the other section obtained by sectioning with that plane. According to FIG. 3, the plane is an imaginary plane that divides the scanning optical device 50 into the right and left sections with the rotational axis of the polygon mirror 10 as the center, and is perpendicular to the paper surface.

A first imaging lens 21 shown in FIGS. 1 and 2 functions as an fθ lens that scans and spot images laser light on the drums at a uniform speed in conjunction with second imaging lenses 22 and 23. The first imaging lens 21 is configured as a cylindrical lens because the light beams emitted from the semiconductor lasers 2 and 3 are incident at different angles. As for the sub-scanning direction, the light beam from the semiconductor laser 2 is imaged by the second imaging lens 22. Similarly, the light beam from the semiconductor laser 3 is imaged by the second imaging lens 23. These imaging lenses are an example of an imaging unit which images the light beams that have been deflected/scanned by the rotating polygonal mirror onto the respective corresponding photosensitive members.

Bending mirrors 24 to 26 are mirrors that reflect the light beams in predetermined directions. The bending mirror 24 is a final bending mirror disposed for the light beam of the semiconductor laser 2. The bending mirror 25 is a separation bending mirror disposed for the light beam of the semiconductor laser 3. The bending mirror 26 is a final bending mirror disposed for the light beam of the semiconductor laser 3. With this arrangement, the light beam of the semiconductor laser 3 is reflected a plurality of times by the separation bending mirror 25 and the final bending mirror 26. Thereby, it is possible to effectively utilize a small space and provide a light beam having an optical path length identical to that of the light beam of the semiconductor laser 2.

A BD sensor 28 detects the light beam emitted from the semiconductor laser 2 and reflected by the polygon mirror 10, and outputs a detection signal in the main scanning direction. This detection signal indicates the timing when the scanning has ended at the other end portion of the image. In Embodiment 1, the BD sensor 28 is an example of a second detection unit which detects the first light beam on the scanning end side in the main scanning direction. A BD lens 29 images the light beams having been reflected by the polygon mirror 10 on the light receiving surface of the BD sensor 28. As described above, the BD sensor 5 detects the timing of the start of scanning, and the BD sensor 28 detects the timing of the end of scanning, whereby it is possible to measure the scan time for the light beam emitted from the semiconductor laser 2 and reflected by the polygon mirror 10.

On the other side of the polygon mirror 10, a first imaging lens 31 and second imaging lenses 32 and 33 corresponding to the semiconductor lasers 12 and 13 are disposed. Similar to the foregoing, a final bending mirror 34 is disposed for the light beam of the semiconductor laser 13, a separation bending mirror 35 is disposed for the light beam of the semiconductor laser 12, and a final bending mirror 36 is disposed for the light beam of the semiconductor laser 13. These imaging lenses are an example of the imaging unit which images the light beams having been deflected/scanned by the rotating polygonal mirror onto the respective corresponding photosensitive members. The light beam of the semiconductor laser 12 is reflected a plurality of times by the separation bending mirror 35 and the final bending mirror 36, whereby it is possible to effectively utilize a small space and provide a light beam having an optical path length identical to that of the light beam of the semiconductor laser 13. It is therefore possible to make the scanning optical device 50 compact.

A BD sensor 38 detects the light beam emitted from the semiconductor laser 2 and reflected by the polygon mirror 10, and outputs a detection signal in the main scanning direction. This detection signal indicates the start timing of scanning at an end portion of an image. In Embodiment 1, the BD sensor 38 is an example of a third detection unit which detects the second light beam on the scanning start side in the main scanning direction.

The BD lens 19 images the light beams that have been reflected by the polygon mirror 10 on the light-receiving surface of the BD sensor 38. The BD sensor 38 detects the timing of the start of scanning, and the BD sensor 15 detects the timing of the end of scanning, whereby it is possible to measure the scan time for the light beam emitted from the semiconductor laser 12 and reflected by the polygon mirror 10.

An upper lid 41 shown in FIG. 2 is attached to the optical casing 40. Thereby, the scanning optical device 50 is hermetically sealed, and dust, toner and the like are prevented from entering into the scanning optical device 50. The upper lid 41 is provided with slit openings at positions corresponding to the photosensitive drums 82a, 82b, 82c and 82d. Dustproof glass members 43a, 43b, 43c and 43d, which are transparent components, are attached to these openings. Accordingly, scanning light can be irradiated onto the photosensitive drums 82a, 82b, 82c and 82d through the dustproof glass members 43a, 43b, 43c and 43d. Further, these dustproof glass members prevent dust, toner and the like from entering into the scanning optical device 50.

Figure 6:
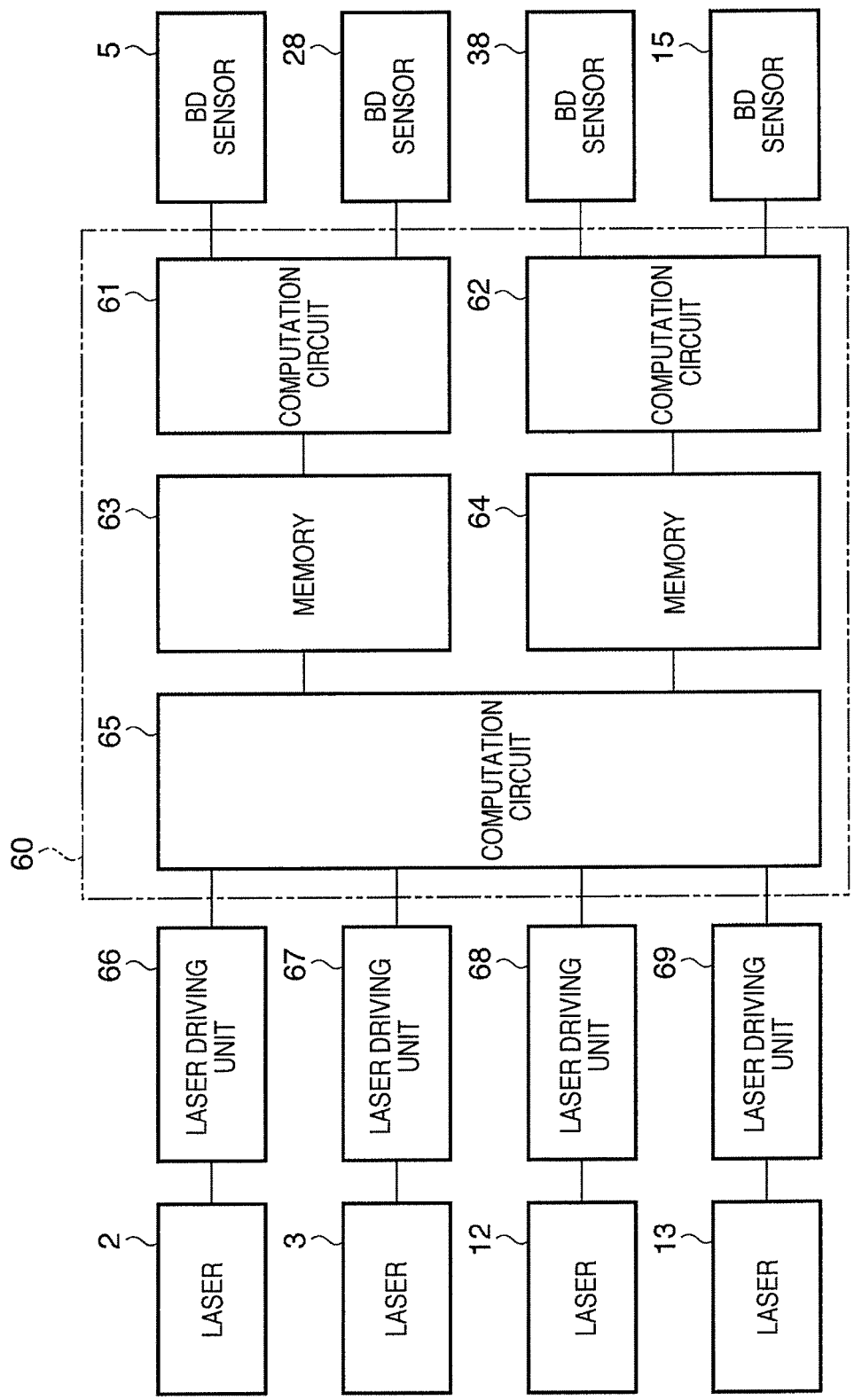
FIG. 6 is a block diagram of a tandem type color printer according to an embodiment of the present invention.

FIG. 6 is a block diagram of a control unit according to an embodiment of the present invention. A jitter correction unit 60 controls the pixel clocks for the semiconductor lasers 2, 3, 12 and 13 to correct the respective jitter due to discrepancies among the reflection coefficients of the reflecting faces of the polygon mirror 10 and changes in the rotational period of the motor that drives the polygon mirror 10. The semiconductor lasers 2, 3, 12 and 13 are supplied with a pixel clock from the corresponding laser driving units 66, 67, 68 and 69. The jitter correction unit 60 includes computation circuits 61 and 62, memories 63 and 64, and a computation circuit 65.

The light beam emitted from the semiconductor laser 2 and reflected by the polygon mirror 10 is detected by the BD sensor 5 disposed on the scanning start side in the main scanning direction and by the BD sensor 28 disposed on the scanning end side in the main scanning direction. A detection signal indicative of the timing of the scanning start is input from the BD sensor 5 to the computation circuit 61. Similarly, a detection signal indicative of the timing of the scanning end is input from the BD sensor 28 to the computation circuit 61. The computation circuit 61 measures the scan time Ani for each reflecting face of the polygon mirror 10 from the detection signals of the BD sensors 5 and 28, and stores the measured scan time Ani in the memory 63. Here, i indicates the ith reflecting face (with i=1, 2, 4, . . . 6 in the present embodiment). Ani may also be expressed as "An,i", and n indicates the nth rotation of the polygon mirror 10. For example, A12 indicates the scan time of the second reflecting face in the first rotation. The computation circuit 61 is an example of a first calculation unit which calculates the time interval between the time when the first light beam is detected by the first detection unit and the time when it is detected by the second detection unit, as the scan time of the first light source.

Figure 7:
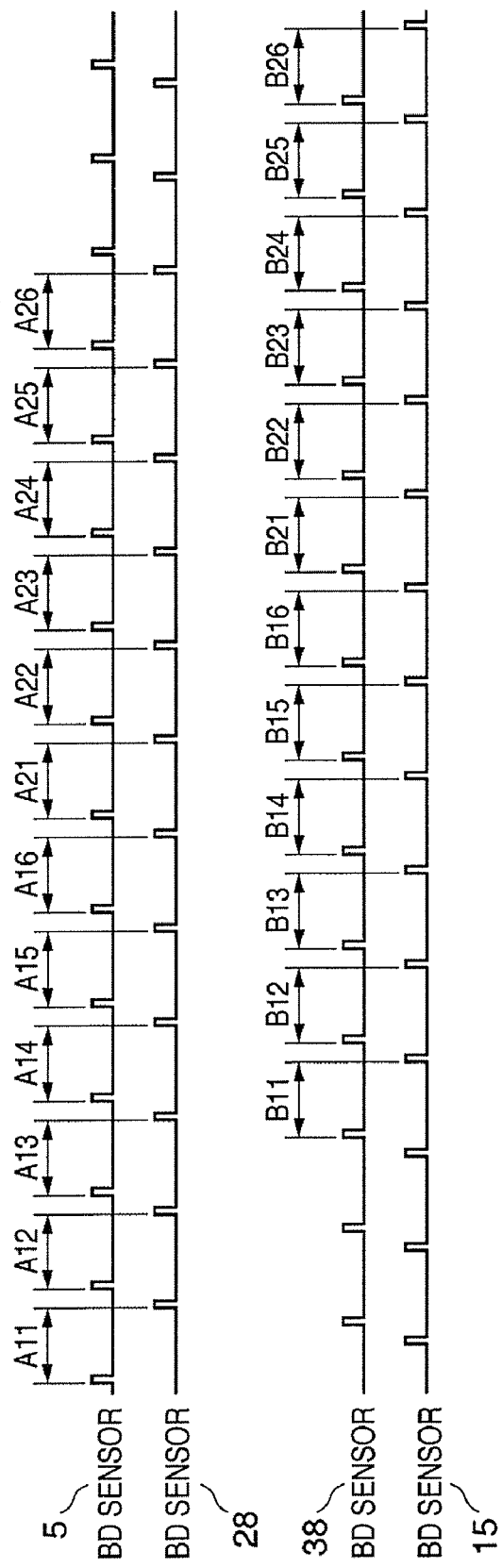
FIG. 7 shows time charts of BD sensors according to an embodiment of the present invention.

FIG. 7 shows time charts of BD sensors according to an embodiment of the present invention. The scan times A11 to A16 corresponding to the first to sixth reflecting faces are stored in the memory 63. The scan times A21 to A26 are measured during the second rotation of the polygon mirror 10, and stored in the memory 63. In this manner, the scan time for each light beam emitted from the semiconductor laser 2 during the n−1th rotation and the nth rotation is stored in the memory 63 for each reflecting face. In the present embodiment, it is assumed that two rotations' worth of scan times are stored in the memory. The memories 63 and 64 are an example of a storage unit that stores the scan time for the reflecting faces of the rotating polygonal mirror calculated by the first calculation unit and the second calculation unit.

The light beam emitted from the semiconductor laser 12 and reflected by the polygon mirror 10 is detected by the BD sensor 38 disposed on the scanning start side in the main scanning direction and by the BD sensor 15 disposed on the scanning end side in the main scanning direction. A detection signal indicative of the timing of the scanning start is input from the BD sensor 38 to the computation circuit 62. Similarly, a detection signal indicative of the timing of the scanning end is input from the BD sensor 15 to the computation circuit 62. The computation circuit 62 measures the scan time Bnj for each reflecting face of the polygon mirror 10 from the detection signals of the BD sensors 38 and 15, and stores the measured time Bnj in the memory 64. Here, j indicates the identification number of the reflecting faces (with j=1, 2, 3, . . . 6 in the present embodiment). n indicates the nth rotation of the polygon mirror 10. For example, B12 indicates the scan time of the second reflecting face in the first rotation. The computation circuit 62 is an example of a second calculation unit which calculates the time interval between the time when the second light beam is detected by the third detection unit and the time when it is detected by the fourth detection unit, as the scan time of the second light source.

The scan times B11 to B16 corresponding to the first to sixth reflecting faces are stored in the memory 64. During the second rotation of the polygon mirror 10, scan times B21 to B26 are measured, and stored in the memory 64. In this manner, the scan time for each light beam emitted from the semiconductor laser 12 during the n−1th rotation and the nth rotation is stored in the memory 64 for each reflecting face. In the present embodiment, it is assumed that two rotations' worth of scan times are stored in the memory.

A laser driving unit 66 causes the semiconductor laser 2 to emit light based on the pixel clock determined by the computation circuit 65. A laser driving unit 67 causes the semiconductor laser 3 to emit light based on a pixel clock similar to that of the laser driving unit 66 calculated by the computation circuit 65. A laser driving unit 68 causes the semiconductor laser 12 to emit light based on the pixel clock determined by the computation circuit 65. A laser driving unit 69 causes the semiconductor laser 13 to emit light based on a pixel clock similar to that of the laser driving unit 68 calculated by the computation circuit 65.

The computation circuit 65 is an example of a jitter correction unit which corrects jitter by controlling a pixel clock supplied to the first light source according to the scan time of the second light source. The computation circuit 65 of Embodiment 1 corrects discrepancies among the reflection coefficients of the reflecting faces by modulating the pixel clock using the scan times of the nth rotation corresponding to the reflecting faces of the polygon mirror 10 when the semiconductor lasers 2 and 3 are caused to emit light. For example, in the case of the first reflecting face, the computation circuit 65 reads out the scan time A21 from the memory 63, and modulates the pixel clock such that the pixel clock becomes $T_0/A21$, that is, $1/A21$ times the reference scan time $T_0$ serving as the reference.

Further, the computation circuit 65 corrects changes in the rotational period of the motor that drives the polygon mirror 10 by modulating the pixel clock using the scan time for the semiconductor laser 12 obtained in the n−1th rotation and that of the nth rotation according to the reflecting faces of the polygon mirror 10. For example, the computation circuit 65 reads out the scan times B11 and B21 from the memory 64, and modulates the pixel clock such that the pixel clock is multiplicated by B11/B21. Finally, the target scan time $T_A$ for the semiconductor lasers 2 and 3 can be expressed by the following equation.

$$T_A = (T_0/A21) \times (B11/B21)$$

The computation circuit 65 modulates the pixel clock so as to obtain the scan time $T_A$. The computation circuit 65 determines a first target scan time $T_A$ necessary for jitter correction based on the scan time Ani, the scan time B(n−1)i and Bni, and modulates a pixel clock to be supplied to the first light source in accordance with the first target scan time $T_A$. Bni may also be expressed as "Bn,i". $T_A$ is an example of a first target scan time. The scan time Ani indicates the scan time for the first light beam deflected by the ith reflecting face during the nth rotation. The scan times B(n−1)i and Bni indicate the scan time for the second light beam deflected by the ith reflecting face obtained during the n−1th rotation and the nth rotation.

As described above, jitter is corrected using the scan time A21 of one rotation before and a change from the scan time B11 of about 1.5 rotation before to the scan time B21 of about 0.5 rotation before obtained on the other side of the polygon mirror 10.

FIG. 8A is a diagram that shows the relationship between the number of rotations and scan time. In FIG. 8A, $T_0$ represents the reference scan time described above. FIG. 8B is a conceptual diagram used to illustrate a jitter correction according to this embodiment. Particularly, as shown in FIG. 8B, the residual error ΔB1 for the scan time $T_A$ is reduced to about half the residual error ΔA1 obtained using a change from the scan time A11 of two rotations before and the scan time A21 of one rotation before. In other words, by correcting a more current change of the rotational period of the motor, jitter can be further reduced. The jitter correction is also executed for the second to sixth reflecting faces in the same manner using the scan time of each reflecting face.

On the other hand, the computation circuit 65 is an example of a jitter correction unit which corrects jitter by controlling a pixel clock to be supplied to the second light source according to the scan time of the first light source. The computation circuit 65 corrects discrepancies among the reflection coefficients of the reflecting faces by modulating the pixel clock according to the reflecting faces of the polygon mirror 10 when the semiconductor lasers 12 and 13 are caused to emit light. For example, in the case of the first reflecting face, the computation circuit 65 reads out the scan time B21 from the memory 64, and modulates the pixel clock such that the pixel clock becomes $T_0/B21$, that is, $1/B21$ times the reference scan time $T_0$. Further, the computation circuit 65 corrects changes in the rotational period of the motor that drives the polygon mirror 10 by modulating the pixel clock using the scan time for the semiconductor laser 2 obtained in the n−1th rotation and that of the nth rotation. For example, the computation circuit 65 reads out the scan time A11 and A21 from the memory 63, and modulates the pixel clock such that the pixel clock is multiplied by A11/A21. Finally, the target scan time $T_B$ for the semiconductor lasers 12 and 13 can be expressed by the following equation.

$$T_B = (T_0/B21) \times (A11/A21)$$

The computation circuit 65 modulates the pixel clock so as to obtain the calculated scan time $T_B$. The computation circuit 65 determines a second target scan time $T_B$ that is necessary to correct jitter based on the scan time Bnj, the scan time A(n−1)j and Anj, and modulates a pixel clock supplied to the second light source in accordance with the second target scan time $T_B$. $T_B$ is an example of a second target scan time. The scan time Bnj indicates the scan time for the second light beam deflected by the jth reflecting face during the nth rotation. The scan times A(n−1)j and Anj indicate the scan time for the first light beam reflected by the jth reflecting face obtained during the n−1th rotation and the nth rotation.

As described above, in the present embodiment, jitter is corrected using the scan time B21 of one rotation before and a change from the scan time A11 of about 1.5 rotation before to the scan time A21 of about 0.5 rotation before obtained in the other side of the polygon mirror 10. Thereby, it is possible to correct a more current change of the rotational period of the motor than the change from the scan time B11 of two rotations before and the scan time B12 of one rotation before, so that jitter can be further reduced. The jitter correction is also executed for the second to sixth reflecting faces in the same manner using the scan time of each reflecting face.

A process flow for forming an image with a color printer 100 by exposing light beams emitted from the semiconductor lasers 2, 3, 12 and 13 onto the photosensitive drums 82a, 82b, 82c and 82d, respectively, as scanning lights E1, E2, E3 and E4 will be described next.

Figure 8C:
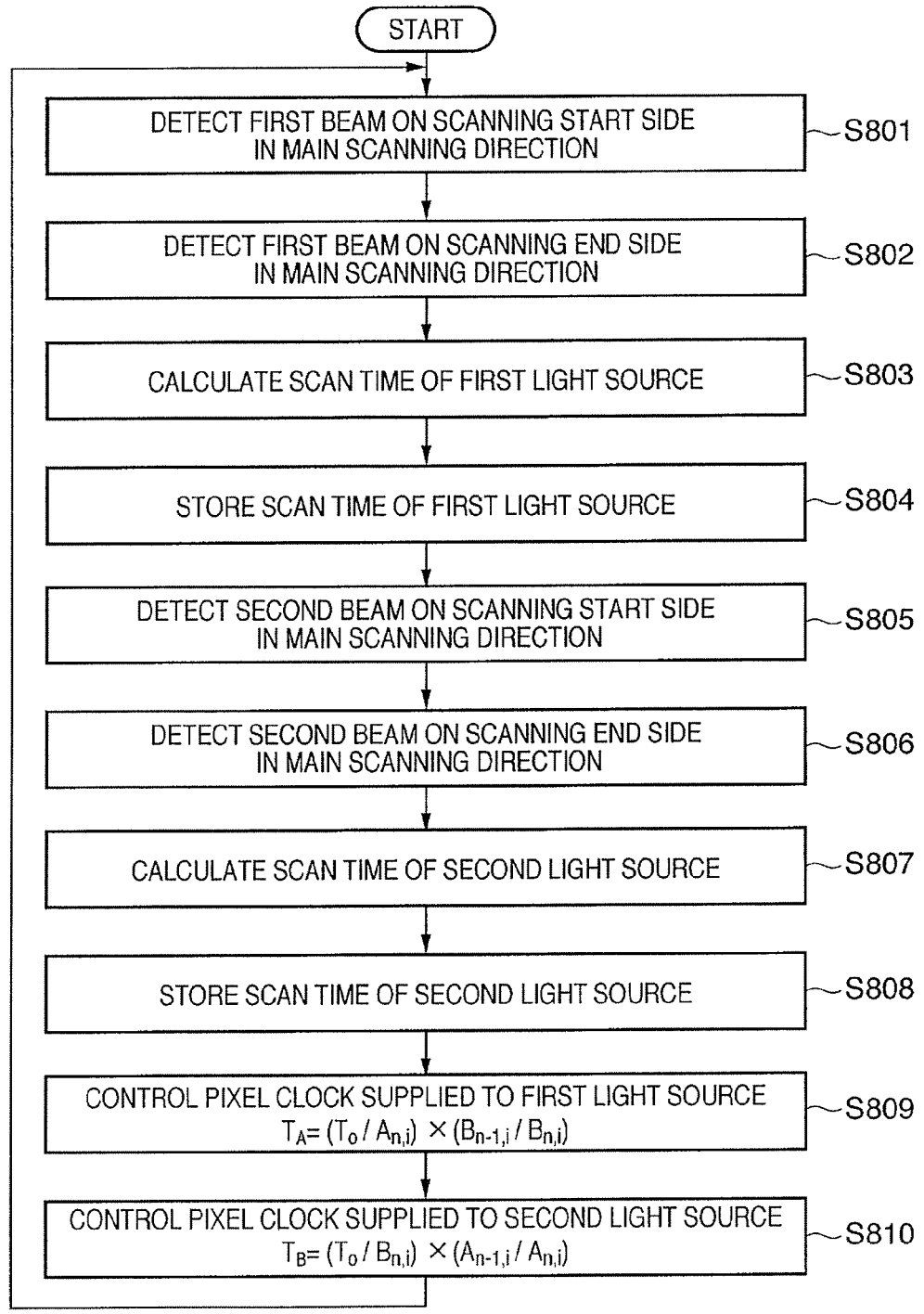
FIG. 8C is a flowchart illustrating a jitter correction method according to an embodiment of the present invention.

FIG. 8C is a flowchart illustrating a jitter correction method according to an embodiment of the present invention. If a signal to start printing is entered, the polygon mirror 10 is rotationally driven by a motor (not shown). When the polygon mirror 10 is rotated a predetermined number of times, the semiconductor laser 2 starts emitting light. The BD sensor 5 detects a first light beam from the semiconductor laser 2 on the scanning start side in the main scanning direction (S801). The BD sensor 28 detects the first light beam from the semiconductor laser 2 on the scanning end side in the main scanning direction (S802). The scan times A11 to A16 for the first to the sixth reflecting faces of the polygon mirror 10 are calculated from the detection signals of the BD sensors 5 and 28 (S803). The measured scan times A11 to A16 are stored in the memory 63 (S804). Then, the second scan times A21 to A26 for the reflecting faces of the polygon mirror 10 are measured, and stored in the memory 63 (S801 to S804). In this manner, the most current two rotations' worth of scan times of the light beam emitted from the semiconductor laser 2 for each reflecting face of the polygon mirror are stored in the memory.

Similarly, the BD sensor 38 detects a second light beam from the semiconductor laser 12 on the scanning start side in the main scanning direction (S805). The BD sensor 15 detects the second light beam from the semiconductor laser 12 on the scanning end side in the main scanning direction (S806). The computation circuit 62 calculates the scan times B11 to B16 for the first to sixth reflecting faces of the polygon mirror 10 from the detection signals of the BD sensors 38 and 15 (S807). The measured scan times B11 to B16 are stored in memory 64 (S808). Then, the second scan times B21 to B26 for the reflecting faces of the polygon mirror 10 are measured, and stored in the memory 64 (S805 to S808). In this manner, the most current two rotations' worth of scan times of the light beam emitted from the semiconductor laser 12 for each reflecting face of the polygon mirror are stored in the memory.

Next, the computation circuit 65 corrects discrepancies among the reflection coefficients of the reflecting faces and changes in the rotational period of the motor driving the polygon mirror 10 according to the reflecting faces of the polygon mirror 10 when the semiconductor lasers 2 and 3 are caused to emit light (S809). This control is performed by using the following equation. Here, i indicates the ith reflecting face, and n indicates the nth rotation of the polygon mirror 10.

$$T_A = (T_0/A_{n,i}) \times (B_{n-1,i}/B_{n,i})$$

For example, in the case of the first reflecting face, the computation circuit 65 calculates a target scan time $T_A$ using the scan time A21, the scan times B11 and B21, and the reference scan time $T_0$.

$$T_A = T_0/A21 \times B11/B21$$

The computation circuit 65 modulates the pixel clock such that the scan time $T_A$ is satisfied (S809). In other words, the pixel clock calculated for each reflecting face of the polygon mirror 10 is modulated with image information. The laser driving unit 66 causes the semiconductor laser 2 to emit light according to this modulation signal. Similarly, the laser driving unit 67 causes the semiconductor laser 3 to emit light according to this modulation signal.

The size of the cross sections of the light beams emitted from the semiconductor lasers 2 and 3 is restricted by the diaphragm units 1c and 1d of the laser holder 1. Further, the light beams are converted to substantially parallel light beams by the collimating lenses 6 and 7, and incident on the lens of the cylindrical lens 8. Those light beams incident on the cylindrical lens 8 that are within the main scanning cross section pass through. On the other hand, the incident light beams that are in the sub-scanning cross section are converged and imaged on the same face of the polygon mirror 10 as a substantially linear image. At this time, the light beams are obliquely incident at an angle θ in the sub-scanning direction. The light beams are then deflected/scanned while the polygon mirror 10 is rotated, so that the light beams are emitted at an angle θ in the sub-scanning direction. Of the two light beams emitted from the polygon mirror 10, the light beam emitted from the semiconductor laser 2 passes through the BD lens 9, and is received by the BD sensor. The BD sensor 5 detects the light beam emitted from the semiconductor laser 2, and outputs a detection signal. In accordance with this detection signal, the timing of the start of scanning from an end portion of an image for the semiconductor lasers 2 and 3 is adjusted.

In this embodiment, the semiconductor lasers 2 and 3 are provided in the sub-scanning direction in the single laser holder 1, so that the semiconductor laser 3 can start scanning from an end portion of an image at the same timing as the semiconductor laser 2. The light beams emitted at an adjusted timing from the semiconductor lasers 2 and 3 pass through the first imaging lens 21. After that, the light beam emitted from the semiconductor laser 2 passes through the second imaging lens 22, is reflected by the final bending mirror 24, passes through the dustproof glass member 43a, and is irradiated onto the photosensitive drum 82a as scanning light E1. On the other hand, the light beam emitted from the semiconductor laser 3 is reflected downward by the separation bending mirror 25, passes through the second imaging lens 23, and is reflected by the final bending mirror 26. This light beam further passes through the dustproof glass member 43b, and is irradiated onto the photosensitive drum 82b as scanning light E2. Then, the light beam emitted from the semiconductor laser 2 and reflected by the polygon mirror 10 passes through the BD lens 29, and is received by the BD sensor 28. The BD sensor 28 detects the timing of the scanning end at the other end portion of the image. The computation circuit 61 then measures the scan time, and the most current scan time is stored in the memory 63. In other words, the scan time is updated continuously.

The computation circuit 65 corrects discrepancies among the reflection coefficients of the reflecting faces of the polygon mirror 10 and changes in the rotational period of the motor driving the polygon mirror 10 by modulating the pixel clock in accordance with the reflecting faces of the polygon mirror 10 when the semiconductor lasers 12 and 13 are caused to emit light (S810). This control is performed by using the following equation. Here, i indicates the ith reflecting face, and n indicates the nth rotation of the polygon mirror 10.

$$T_3 = (T_0/B_{n,i}) \times (A_{n-1,i}/A_{n,i})$$

In the case of the first reflecting face, the scan time B21, the scan times A11 and A21, and the reference scan time $T_0$ are substituted into the following equation to calculate the target scan time $T_B$.

$$T_3 = T_0/B21 \times A11/A21$$

Accordingly, the pixel clock calculated by the computation circuit 65 for each reflecting face of the polygon mirror 10 is modulated with image information (S810). The laser driving unit 68 causes the semiconductor laser 12 to emit light in accordance with this modulation signal. Likewise, the laser driving unit 69 causes the semiconductor laser 13 to emit light according to this modulation signal.

The light beams emitted from the semiconductor lasers 12 and 13 pass through the diaphragm units 11c and 11d, the collimating lens 16 and 17, and the cylindrical lens 18, and are incident on the polygon mirror 10. At this time, the light beams are obliquely incident at an angle θ in the sub-scanning direction. The light beams are then deflected/scanned while the polygon mirror 10 is rotated, so that the light beams are emitted at an angle θ in the sub-scanning direction. Of the two light beams emitted from the polygon mirror 10, the light beam originated from the semiconductor laser 12 passes through the BD lens 19, and is received by the BD sensor 38. The BD sensor 38 detects the light beam emitted from the semiconductor laser 12, and outputs a detection signal. In accordance with this detection signal, the timing of the scanning start from an end portion of an image for the semiconductor lasers 12 and 13 is adjusted.

In this embodiment, the semiconductor lasers 12 and 13 are provided in the sub-scanning direction in the single laser holder 11, so that the semiconductor laser 13 can start scanning from an end portion of an image at the same timing as the semiconductor laser 12. The light beams emitted at an adjusted timing from the semiconductor lasers 12 and 13 pass through the first imaging lens 31. After that, the light beam emitted from the semiconductor laser 12 is reflected downward by the separation bending mirror 35, passes through the second imaging lens 33, and is reflected by the final bending mirror 36. This light beam further passes through the dustproof glass member 43c, and is irradiated onto the photosensitive drum 82c as scanning light E3.

On the other hand, the light beam emitted from the semiconductor laser 13 passes through the second imaging lens 32, and is reflected by the final bending mirror 34. Further, this light beam passes through the dustproof glass member 43d, and is irradiated onto the photosensitive drum 82d as scanning light E4. After that, the light beam originated from the semiconductor laser 12 passes through the BD lens 39, and is received by the BD sensor 15. The BD sensor 15 detects the timing of the scanning end at the other end portion of the image. Further, the computation circuit 62 measures the scan time from the detection signals from the BD sensors 15 and 38, and the most current scan time is stored in the memory 64.

In this manner, the scanning lights E1, E2, E3 and E4 having undergone jitter correction are irradiated onto the photosensitive drums 82a, 82b, 82c and 82d, respectively as scanning lights. The photosensitive drums are uniformly charged in advance by the corresponding primary charging devices 83a, 83b, 83c and 83d. An electrostatic latent image is formed on each photosensitive drum 82a, 82b, 82c, 82d by the exposure. The development devices 84a, 84b, 84c and 84d attach their color toner onto the electrostatic latent images to form toner images on the photosensitive drums 82a, 82b, 82c and 82d. The toner images are transferred from the photosensitive drums 82a, 82b, 82c and 82d onto the intermediate transfer belt 87 at the primary transfer nip portions. On the other hand, the transfer paper is supplied sheet by sheet by the paper feed roller 93 from the paper feed cassette 92. When the transfer paper is conveyed to the pair of registration rollers 94, the conveyance stops once. At the timing when a toner image is conveyed, the conveyance of the transfer paper is resumed. In the secondary transfer unit, the toner image is transferred onto the transfer paper from the intermediate transfer belt 87. Thereby, an image is formed on the transfer paper. The fixing device 95 fixes the image on the transfer paper with heat. The transfer paper is conveyed by the pair of conveying rollers 96 and the pair of discharge rollers 97, and discharged onto the discharge tray 98.

As described above, the exposure is performed while performing the jitter correction for each color, so that a shift of the exposure position in the main scanning direction is suppressed, and a high definition image having less color shift in the main scanning direction can be formed.

As described above, the scanning optical device 50 deflects/scans a plurality of laser light beams emitted from the semiconductor lasers 2, 3, 12 and 13 simultaneously with the single polygon mirror 10, and irradiates the laser light beams onto the plurality of photosensitive drums 82a, 82b, 82c and 82d. Accordingly, the number of components is reduced, and the scanning optical device 50 can be made compact at low cost. Further, in the scanning optical device 50, the light beam of the semiconductor laser 3 is reflected a plurality of times by the separation bending mirror 25 and the final bending mirror 26. Further, in the scanning optical device 50, the light beam of the semiconductor laser 12 is reflected a plurality of times by the separation bending mirror 35 and the final bending mirror 36. With this configuration, it is possible to effectively utilize a small space and provide light beams having the same optical path length, and the scanning optical device 50 can be made more compact. Therefore, the color printer 100 can also be made compact at low cost.

It is also possible that a light beam is incident from both sections obtained by sectioning the scanning optical device with the plane passing through the rotational axis with respect to each reflecting face of the polygon mirror 10 and the scan time is measured. In other words, the scan time can be measured twice for each reflecting face during a single rotation of the polygon mirror 10. The jitter correction unit 60 controls a pixel clock supplied to the semiconductor laser 2 and 3 in accordance with the scan time of the semiconductor laser 12. On the other hand, the jitter correction unit 60 corrects jitter by controlling a pixel clock supplied to the semiconductor lasers 12 and 13 according to the scan time of the semiconductor laser 2. For example, the jitter correction unit 60 modulates the pixel clock using scan time measured in one section and a change from the scan time of substantially 1.5 rotations before and the scan time of substantially 0.5 rotations before measured in the other section. Thereby, it is possible to reduce short term jitter resulting from discrepancies among the reflection coefficients of the reflecting faces and long term jitter resulting from changes in the rotational period of the motor that drives the polygon mirror 10. Particularly, by modulating the pixel clock using an amount of change between the scan time of substantially 1.5 rotations before and the scan time of substantially 0.5 rotations before obtained in the other side of the polygon mirror 10, a more current change of the rotational period of the motor can be corrected. Accordingly, jitter can be further reduced. As described above, it is possible to correct jitter and perform exposure control, so that a shift of the exposure position in the main scanning direction can be suppressed. In other words, the color printer 100 can form high definition images having less color shift in the main scanning direction. Accordingly, it is possible to achieve a color printer 100 that is made compact and capable of providing high definition images.

Embodiment 2

Embodiment 2 will be described below with reference to FIGS. 9 to 11. Particularly, Embodiment 2 employs a configuration in which the BD sensors 28 and 38 can be omitted.

Figure 9:
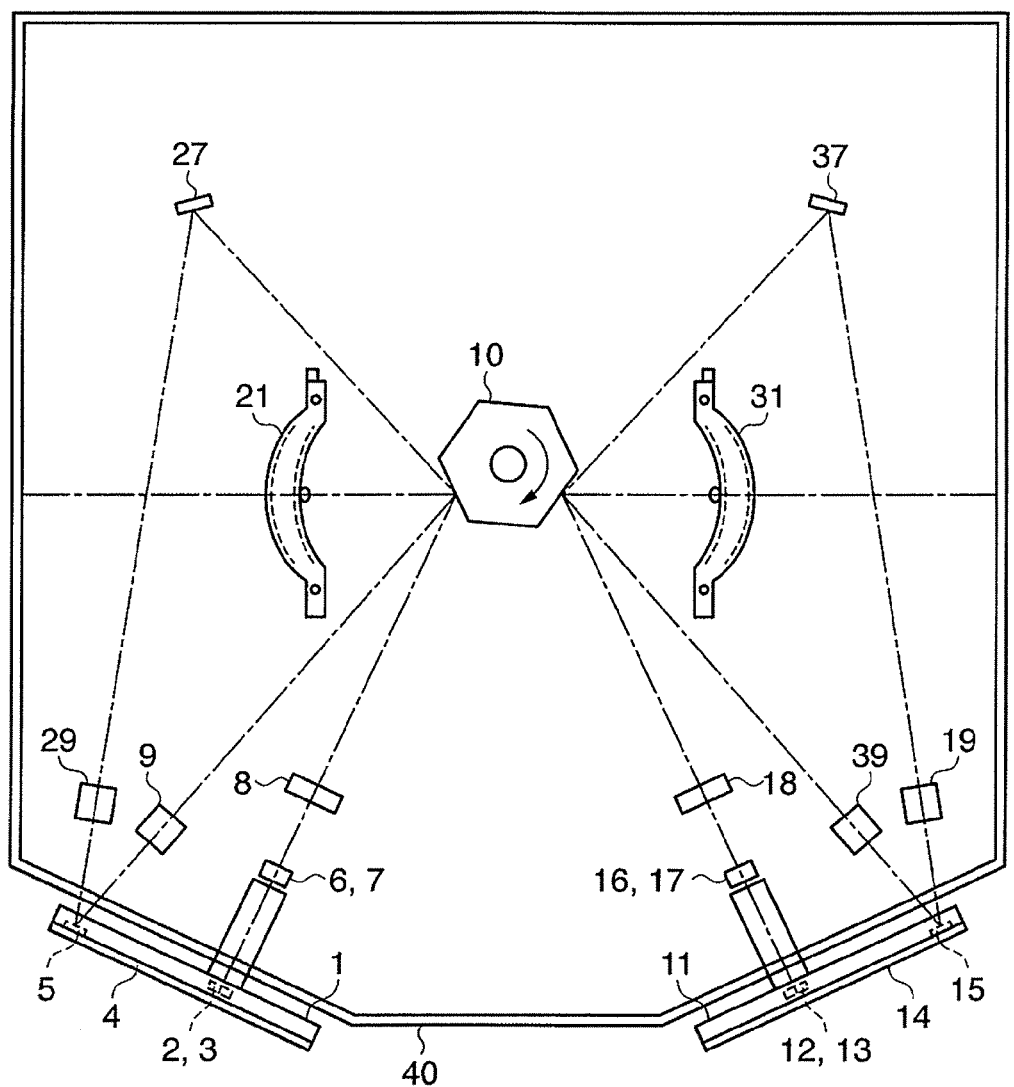
FIG. 9 is a simple plan view of a scanning optical device according to Embodiment 2 of the present invention.

FIG. 9 is a schematic plan view of a scanning optical device according to Embodiment 2 of the present invention. In Embodiment 2, the same reference numerals are assigned to the same components of Embodiment 1, and their description is omitted here.

It can be seen from the comparison between FIGS. 9 and 3 that the BD sensor 28 is omitted, and instead, a BD mirror 27 is added, and the position of the BD lens 29 is changed. The BD mirror 27 is a reflection mirror that reflects a light beam that is emitted from the semiconductor laser 2 and reflected by the polygon mirror 10 toward the BD sensor 5. The BD lens 29 is a lens that images the light beam reflected by the BD mirror 27 onto the light-receiving surface of the BD sensor 5.

In other words, the light beam emitted from the semiconductor laser 2 and reflected by the polygon mirror 10 passes through the BD lens 9 and is received by the BD sensor 5 when the scanning starts. When the scanning ends, the light beam is reflected by the BD mirror 27, passes through the BD lens 29, and is received again by the BD sensor 5. Accordingly, the BD sensor 5 detects the light beam that has passed through the BD lens 9, and outputs a detection signal when the scanning starts. When the scanning ends, the BD sensor detects the light beam that has been reflected by the BD mirror 27 and passed through the BD lens 29, and outputs a detection signal. It is therefore possible to measure the scan time of the semiconductor laser 2 from the time interval between the detection signal output from the BD sensor 5 at the start of the scanning and that output from the BD sensor 5 at the end of the scanning.

As described above, Embodiment 2 is advantageous in that the first detection unit and the second detection unit can be realized by the same sensor by providing the BD mirror 27. Another advantage is that the measurement of the scan time of the semiconductor laser 2 is not influenced by sensitivity differences among sensors. Even if an irregular change occurs such as if the sensitivity characteristics of the sensor change due to a temperature change, or if the detection face of the sensor is smudged, the measured scan time is not influenced by the differences among sensors, so that the jitter correction is stabilized. Further, the number of electric components as well as the number of wire harnesses can be reduced, leading to an improvement of assembling properties. Furthermore, a compact scanning optical device 50 can be realized easily at low cost. The BD mirror 27 is an example of a first mirror that reflects the first light beam that has been deflected toward the scanning end side in the main scanning direction toward the first detection unit.

It can be seen from the comparison between FIGS. 9 and 3 that the BD sensor 38 is omitted, and instead, a BD mirror 37 is added, and the position of the BD lens 19 is changed. The BD mirror 37 is a reflection mirror that reflects a light beam that is emitted from the semiconductor laser 12 and reflected by the polygon mirror 10 toward the BD sensor 15. The BD lens 19 is a lens that images the light beam reflected by the BD mirror 37 onto the light-receiving surface of the BD sensor 15. In other words, the light beam emitted from the semiconductor laser 12 and reflected by the polygon mirror 10 is reflected by the BD mirror 37, passes through the BD lens 19, and is received by the BD sensor 15 when the scanning starts. When the scanning ends, the light beam passes through the BD lens 39, and is received again by the BD sensor 15. Accordingly, the BD sensor 15 detects the light beam that has been reflected by the BD mirror 37 and passed through the BD lens 19, and outputs a detection signal when the scanning starts. When the scanning ends, the BD sensor 15 detects the light beam that has passed through the BD lens 39, and outputs a detection signal. It is therefore possible to measure the scan time of the semiconductor laser 12 from the time interval between the detection signal output from the BD sensor 15 at the start of the scanning and that output from the same at the end of the scanning. As described above, Embodiment 2 is advantageous in that the third detection unit and the fourth detection unit can be realized by the same sensor by providing the BD mirror 37. Another advantage is that the measurement of the scan time is not influenced by differences among sensors as described above. Further, the number of electric components as well as the number of wire harnesses can be reduced, leading to an improvement of assembling properties. Furthermore, a compact scanning optical device 50 can be realized easily at low cost. The BD mirror 37 is an example of a second mirror that reflects the second light beam deflected toward the scanning start side in the main scanning direction toward a fourth detection unit.

Figure 10:
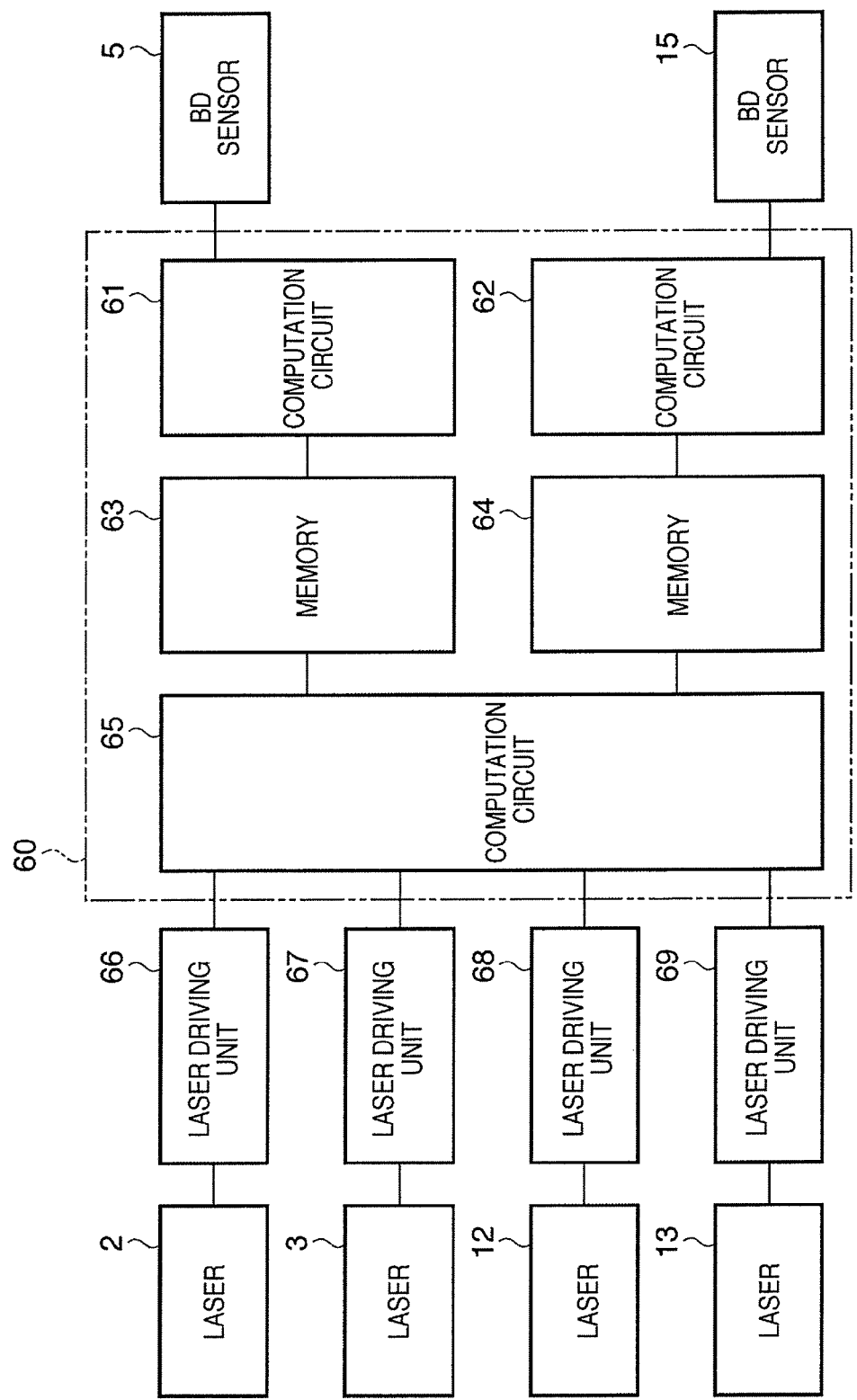
FIG. 10 is a block diagram of a tandem type color printer according to Embodiment 2 of the present invention.

FIG. 10 is a block diagram of a tandem type color printer according to Embodiment 2 of the present invention. FIG. 11 is a time chart of BD sensors according to Embodiment 2 of the present invention.

It can be seen from the comparison between FIGS. 10 and 6 that the BD sensors 28 and 38 are omitted. For this reason, the computation circuit 61 can measure the scan time of the semiconductor laser 2 from the interval between the detection signal output from the BD sensor 5 at the start of the scanning and that output from the BD sensor 5 at the end of the scanning. Similarly, the computation circuit 62 can measure the scan time of the semiconductor laser 12 from the interval between the detection signal outputted from the BD sensor 5 at the start of the scanning and that outputted from the BD sensor 5 at the end of the scanning.

Figure 11:
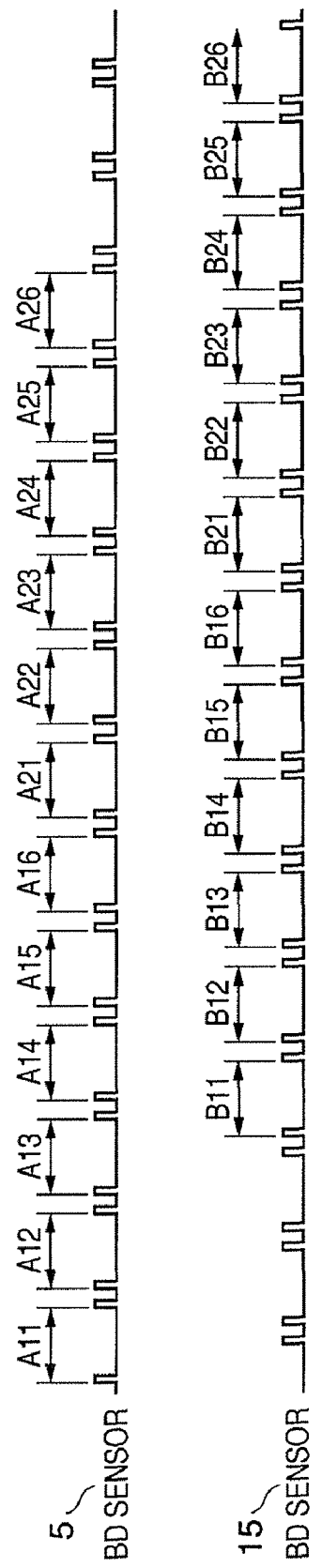
FIG. 11 is a time chart of BD sensors according to Embodiment 2 of the present invention.

Referring to FIG. 11, the computation circuit 61 measures the scan time Ani for each reflecting face of the polygon mirror 10 from two detection signals output successively from the BD sensor 5. The measured scan time Ani is stored in the memory 63. Here, i indicates the ith reflecting face (with i=1 to 6 in the present embodiment). n indicates the nth rotation of the polygon mirror 10.

The computation circuit 62 detects the scan time Bnj for each reflecting face of the polygon mirror 10 from two detection signals successively output from the BD sensor 15. The measured scan time Bnj is stored in the memory 64. Here, j indicates the jth reflecting face (with j=1 to 6 in the present embodiment), and n indicates the nth rotation of the polygon mirror 10.

The jitter correction process executed by the computation circuit 65 is the same as that of Embodiment 1, so that the description thereof is omitted here.

As described above, according to Embodiment 2, further effects can be produced in addition to the effects of Embodiment 1. Specifically, Embodiment 2 is configured such that the BD sensors 5 and 28 described in Embodiment 1 are realized by the same sensor (BD sensor 5), so that the BD sensor 28 can be omitted. Further, the influence due to the differences among sensors can be eliminated. Similarly, Embodiment 2 is configured such that the BD sensors 15 and 38 described in Embodiment 1 are realized by the same sensor (BD sensor 15), so that the BD sensor 38 can be omitted. Further, the influence due to differences among sensors can be eliminated.

Embodiment 3

Embodiment 3 will be described below with reference to FIGS. 12 to 14. Similar to Embodiment 2, Embodiment 3 also employs a configuration in which the BD sensors 28 and 38 can be omitted.

Figure 12:
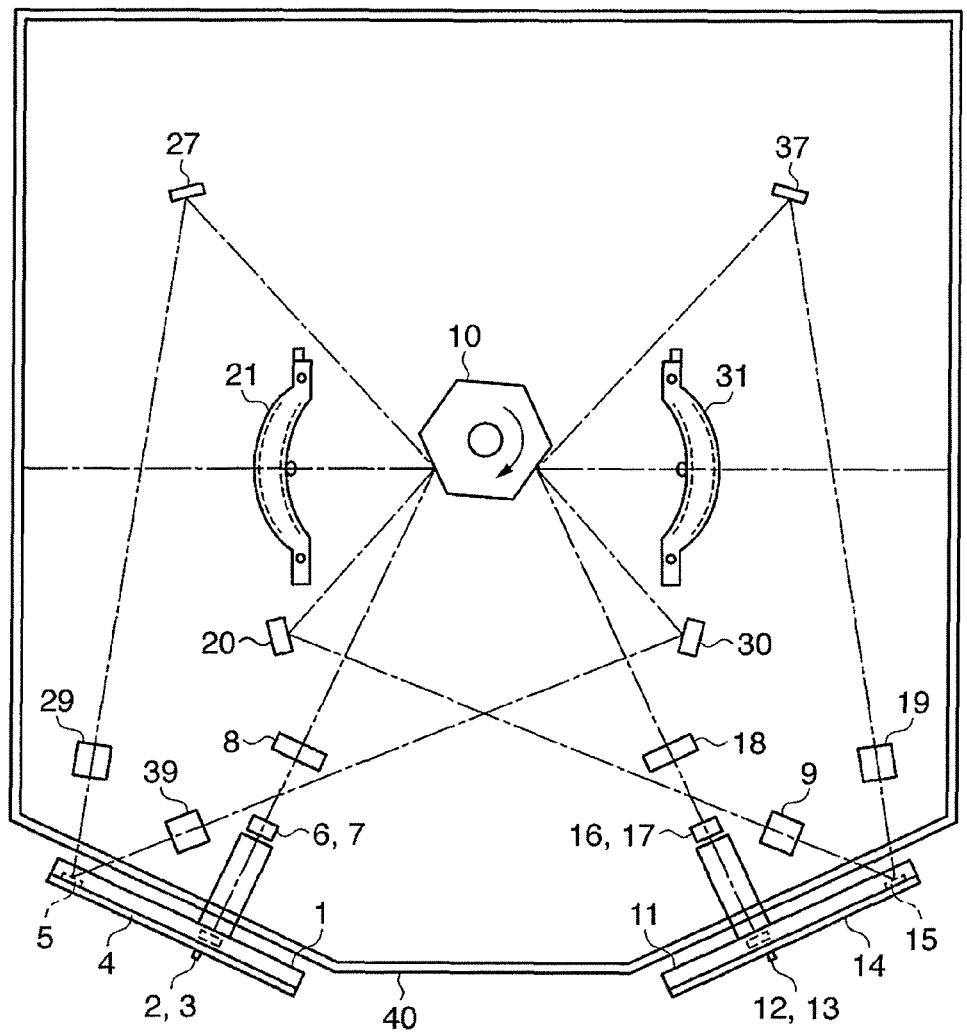
FIG. 12 is a schematic plan view of a scanning optical device according to Embodiment 3 of the present invention.

FIG. 12 is a schematic plan view of a scanning optical device according to Embodiment 3 of the present invention. In Embodiment 3, the same reference numerals are assigned to the same components of Embodiment 1, and their description is omitted here.

It can be seen from the comparison between FIGS. 12 and 3 that the BD sensors 28 and 38 are omitted, and instead, BD mirrors 27 and 37 are added. It can be seen from the comparison between FIGS. 12 and 9 that further BD mirrors 20 and 30 are added.

The difference to Embodiment 2 is the provision of the BD mirror 20 that reflects, toward the BD sensor 15, a light beam deflected toward the scanning start side in the main scanning direction from among the light beams emitted from the semiconductor laser 2. The position of the BD lens 9 is also changed. The light beam reflected by the BD mirror 20 passes through the BD lens 9, and is incident on the BD sensor 15. The BD mirror 20 is an example of a first mirror that reflects the first light beam deflected toward the scanning start side in the main scanning direction toward the third detection unit.

Also, there is provided the BD mirror 30 that reflects, toward the BD sensor 5, the light beam deflected toward the scanning end side in the main scanning direction from among the light beams emitted from the semiconductor laser 12. Accordingly, the position of the BD lens 39 is also changed. The light beam reflected by the BD mirror 30 passes through the BD lens 39, and is incident on the BD sensor 5. The BD mirror 30 is an example of a second mirror that reflects, toward the second detection unit, the second light beam deflected toward the scanning end side in the main scanning direction.

Figure 13:
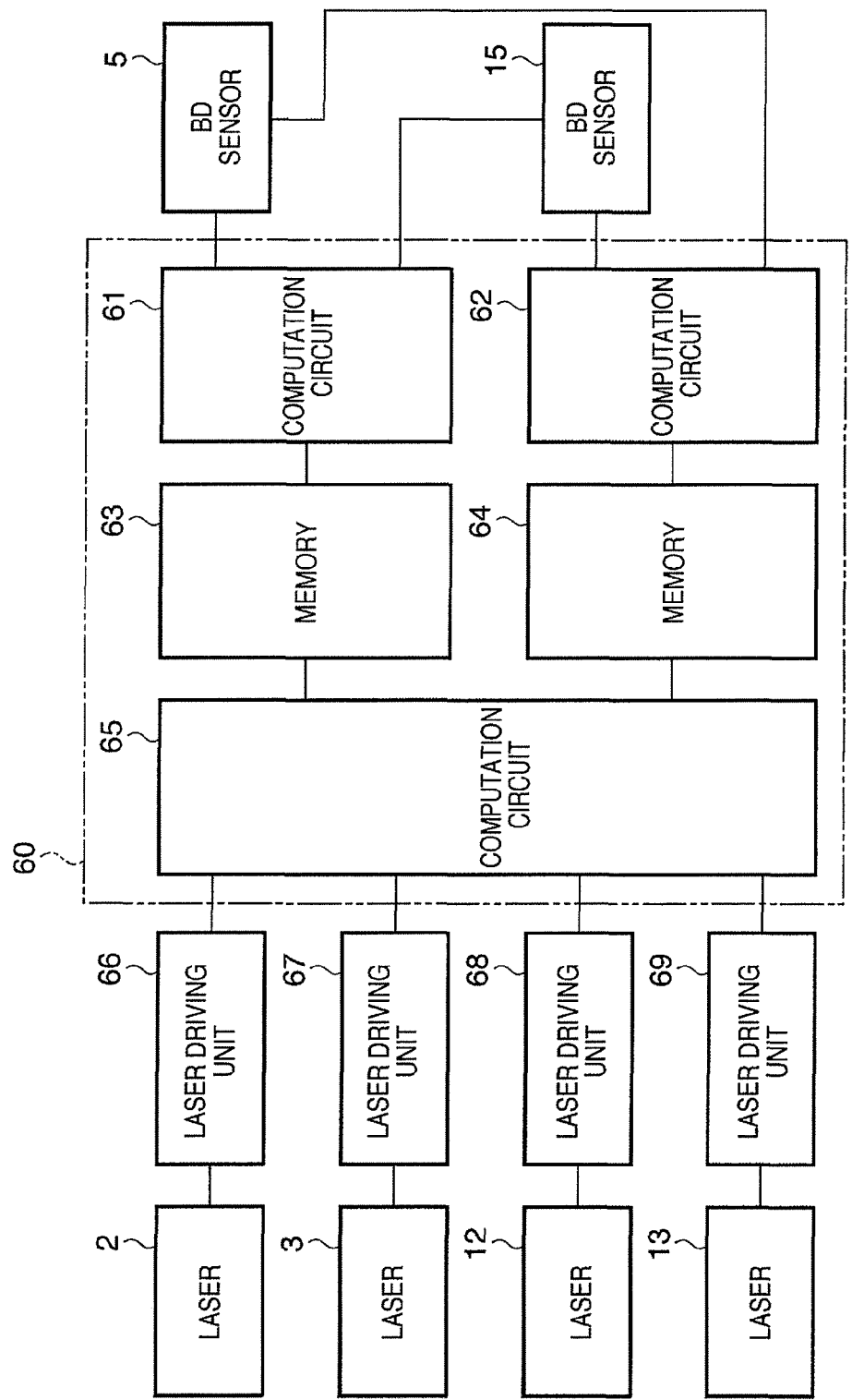
FIG. 13 is a block diagram of a tandem type color printer according to Embodiment 3 of the present invention.

FIG. 13 is a block diagram of a control unit according to Embodiment 3 of the present invention. It can be seen from the comparison between FIGS. 6 and 9 that the detection signal of the BD sensor 5 is input to both the computation circuits 61 and 62. Similarly, the detection signal of the BD sensor 15 is input to both the computation circuit 61 and 62.

FIG. 14 is a time chart of BD sensors according to Embodiment 3 of the present invention. The computation circuit 61 measures the scan time Ani for each reflecting face of the polygon mirror 10 from the detection signal output from the BD sensor 5 and that output from the BD sensor 15. The measured scan time Ani is stored in the memory 63, where i indicates the ith reflecting face (with i=1 to 6 in the present embodiment), and n indicates the nth rotation of the polygon mirror 10.

The computation circuit 62 measures the scan time Bnj for each reflecting face of the polygon mirror 10 from the detection signal output from the BD sensor 15 and that output from the BD sensor 5. The measured scan time Bnj is stored in the memory 64, where j indicates the jth reflecting face, j=1 to 6 in the present embodiment, and n indicates the nth rotation of the polygon mirror 10.

The jitter correction process executed by the computation circuit 65 is the same as that of Embodiment 1, so that the description thereof is omitted here.

As described above, according to Embodiment 3, effects similar to those of Embodiment 2 can be attained.

Other Embodiments

The configurations described in the above embodiments may be combined where appropriate. For example, the configuration shown in the right half of FIG. 3 may be replaced by the configuration shown in the right half of FIG. 9. Conversely, it is also possible to replace the configuration shown in the left half of FIG. 3 by the configuration shown in the left half of FIG. 9.

Further, the number of reflection mirrors and the number of reflections described in the above embodiments are merely exemplary, and the present invention is not limited thereto. In the present invention, the number of reflection mirrors and the number of reflections can be set to any value as long as the scan time Ani and Bnj for each reflecting face can be measured.

The embodiments described above employ the method in which two laser light beams are incident on each of both sides of the single polygon mirror to expose the four photosensitive drums. However, the present invention is not limited to this configuration. For example, it is possible to employ a method in which a single laser light beam is incident on each of both sides of the single polygon mirror to expose two photosensitive drums. In this case, two scanning optical devices are required to expose four photosensitive drums.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-132030, filed on May 17, 2007, which is hereby incorporated by reference herein in its entirety.

What is claimed is:

1. A scanning optical device comprising:
a rotating polygonal mirror provided with a plurality of reflecting faces that reflect an incident light beam while the rotating polygonal mirror is rotated;
a first light source which emits a first light beam from one section obtained by sectioning said scanning optical device with a plane passing through the rotation axis of said rotating polygonal mirror;
a second light source which emits a second light beam from the other section obtained by the sectioning with said plane;
an imaging unit which images the first and second light beams having been deflected/scanned by said rotating polygonal mirror onto corresponding photosensitive members;
a first detection unit which detects the first light beam on the scanning start side in the main scanning direction;
a second detection unit which detects the first light beam on the scanning end side in the main scanning direction;
a third detection unit which detects the second light beam on the scanning start side in the main scanning direction;
a fourth detection unit which detects the second light beam on the scanning end side in the main scanning direction;
a first calculation unit which calculates a time interval between the time when the first light beam is detected by said first detection unit and the time when the first light beam is detected by said second detection unit as a scan time of said first light source;
a second calculation unit which calculates a time interval between the time when the second light beam is detected by said third detection unit and the time when the second light beam is detected by said fourth detection unit as a scan time of said second light source;
a storage unit which stores the scan times for said respective reflecting faces of said rotating polygonal mirror calculated by said first calculation unit and said second calculation unit; and
a jitter correction unit which corrects jitter by controlling a pixel clock supplied to said first light source in accordance with the scan time of said second light source, and a pixel clock supplied to said second light source in accordance with the scan time of said first light source.

2. The scanning optical device according to claim 1, wherein said jitter correction unit is adapted to determine a first target scan time necessary to correct jitter from the scan time at the nth rotation for the first light beam that has been deflected by the ith reflecting face, and the scan time at the nth rotation and scan time at the n−1th rotation for the second light beam that has been deflected by said ith reflecting face, and further adapted to modulate the pixel clock supplied to said first light source in accordance with the determined first target scan time.

3. The scanning optical device according to claim 1, wherein said jitter correction unit is adapted to determine second target scan time necessary to correct jitter from the scan time at the nth rotation for the second light beam that has been deflected by the jth reflecting face, and the scan time at the nth rotation and scan time at the n−1th rotation for the first light beam that has been deflected by said jth reflecting face, and further adapted to modulate the pixel clock supplied to said second light source in accordance with the determined second target scan time.

4. The scanning optical device according to claim 1, wherein said first detection unit and said second detection unit are realized by the same sensor by further providing a first mirror which reflects the first light beam that has been deflected toward the scanning end side in the main scanning direction toward said first detection unit.

5. The scanning optical device according to claim 1, wherein said third detection unit and said fourth detection unit are realized by the same sensor by further providing a second mirror which reflects the second light beam that has been deflected toward the scanning start side in the main scanning direction toward said fourth detection unit.

6. The scanning optical device according to claim 1,
wherein said first detection unit and said third detection unit are realized by the same sensor by further providing a first mirror which reflects the first light beam that has been deflected toward the scanning start side in the main scanning direction toward said third detection unit, and
said second detection unit and said fourth detection unit are realized by the same sensor by further providing a second mirror which reflects the second light beam that has been deflected toward the scanning end side in the main scanning direction toward said second detection unit.

7. An image forming device comprising:
a plurality of photosensitive members;
a charging device which charges said photosensitive members;
a scanning optical device including:
   a rotating polygonal mirror provided with a plurality of reflecting faces that reflect an incident light beam while the rotating polygonal mirror is rotated;
   a first light source which emits a first light beam from one section obtained by sectioning said scanning optical device with a plane passing through the rotation axis of said rotating polygonal mirror;
   a second light source which emits a second light beam from the other section obtained by the sectioning with said plane;
   an imaging unit which images the first and second light beams having been deflected/scanned by said rotating polygonal minor onto corresponding ones of said photosensitive members;
   a first detection unit which detects the first light beam on the scanning start side in the main scanning direction;
   a second detection unit which detects the first light beam on the scanning end side in the main scanning direction;
   a third detection unit which detects the second light beam on the scanning start side in the main scanning direction;
   a fourth detection unit which detects the second light beam on the scanning end side in the main scanning direction;
   a first calculation unit which calculates a time interval between the time when the first light beam is detected by said first detection unit and the time when the first light beam is detected by said second detection unit as a scan time of said first light source;
   a second calculation unit which calculates a time interval between the time when the second light beam is detected by said third detection unit and the time when the second light beam is detected by said fourth detection unit as a scan time of said second light source;
   a storage unit which stores the scan times for said respective reflecting faces of said rotating polygonal minor calculated by said first calculation unit and said second calculation unit; and
   a jitter correction unit which corrects jitter by controlling a pixel clock supplied to said first light source in accordance with the scan time of said second light source, and a pixel clock supplied to said second light source in accordance with the scan time of said first light source,
wherein said scanning optical device forms an electrostatic latent image by scanning the surface of said photosensitive members with a light beam corresponding to image information;
a development device which forms a developed image by developing the electrostatic latent image; a transfer device which transfers the developed image onto paper; and
a fixing device which fixes the developed image onto the paper.

8. A jitter correction method for a scanning optical device comprising:
a rotating polygonal mirror provided with a plurality of reflecting faces that reflect an incident light beam while the rotating polygonal mirror is rotated;
a first light source which emits a first light beam from one section obtained by sectioning said scanning optical device with a plane passing through the rotation axis of said rotating polygonal mirror;
a second light source which emits a second light beam from the other section obtained by the sectioning with said plane; and
an imaging unit which images the first and second light beams having been deflected/scanned by said rotating polygonal mirror onto corresponding photosensitive members, said method comprising:
a first detection step of detecting the first light beam on the scanning start side in the main scanning direction;
a second detection step of detecting the first light beam on the scanning end side in the main scanning direction;
a third detection step of detecting the second light beam on the scanning start side in the main scanning direction;
a fourth detection step of detecting the second light beam on the scanning end side in the main scanning direction;
a first calculation step of calculating a time interval between the time when the first light beam is detected in said first detection step and the time when the first light beam is detected in said second detection step as a scan time of said first light source;
a second calculation step of calculating a time interval between the time when the second light beam is detected in said third detection step and the time when the second light beam is detected in said fourth detection step as a scan time of said second light source;
a storage step of storing the scan times for said respective reflecting faces of said rotating polygonal mirror calculated in said first calculation step and said second calculation step; and
a jitter correction step of correcting jitter by controlling a pixel clock supplied to said first light source according to the scan time of said second light source, and a pixel clock supplied to said second light source according to the scan time of said first light source.

* * * * *